US007089789B2

(12) United States Patent
Klopfer et al.

(10) Patent No.: US 7,089,789 B2
(45) Date of Patent: Aug. 15, 2006

(54) SYSTEM FOR CALIBRATING AN INTEGRATED INJECTION NOZZLE AND INJECTION PUMP

(75) Inventors: Kenneth H. Klopfer, East Hartland, CT (US); Michael O'Brien, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 170 days.

(21) Appl. No.: 10/504,950

(22) PCT Filed: Mar. 19, 2003

(86) PCT No.: PCT/US03/08550

§ 371 (c)(1),
(2), (4) Date: Aug. 18, 2004

(87) PCT Pub. No.: WO03/081014

PCT Pub. Date: Oct. 2, 2003

(65) Prior Publication Data

US 2005/0150271 A1 Jul. 14, 2005

(51) Int. Cl.
*F02M 65/00* (2006.01)
*F02M 59/20* (2006.01)
*G01F 25/00* (2006.01)

(52) U.S. Cl. ...................... 73/119 A; 73/1.19; 73/1.26; 73/1.39; 73/119 R; 239/533.1; 239/533.2; 239/533.6

(58) Field of Classification Search ................. 73/1.16, 73/1.19, 1.25, 1.26, 1.36, 1.42, 1.71, 1.72, 73/1.88, 119 R, 119 A; 239/533.1, 533.2, 239/533.6
See application file for complete search history.

(56) References Cited

U.S. PATENT DOCUMENTS

| | | | | |
|---|---|---|---|---|
| 2,691,888 | A * | 10/1954 | Daulby | 73/118.1 |
| 2,796,674 | A * | 6/1957 | Ross | 81/429 |
| 3,667,437 | A * | 6/1972 | Dreisin | 123/449 |
| 3,946,590 | A * | 3/1976 | Bechstein et al. | 73/1.36 |
| 4,254,653 | A * | 3/1981 | Casey et al. | 73/1.26 |
| 4,615,722 | A * | 10/1986 | Steffan et al. | 65/158 |
| 5,265,576 | A * | 11/1993 | McMahon et al. | 123/458 |
| 5,634,448 | A * | 6/1997 | Shinogle et al. | 123/480 |
| 6,260,404 | B1 * | 7/2001 | Aota et al. | 73/1.36 |

* cited by examiner

*Primary Examiner*—Hezron Williams
*Assistant Examiner*—David A. Rogers
(74) *Attorney, Agent, or Firm*—Alix, Yale & Ristas, LLP

(57) ABSTRACT

A fuel injection system (18) is calibrated as an assembled system. The fuel injection system (18) includes a unit pump (10) a cam follower (24), a joined fuel injection line (14) and injection nozzle (16). The fuel injection system (18) is mounted to a test stand an is subsequently calibrated to a specified fuel delivery and timing. The relative positions of the unit pump (10) and fuel injection nozzle (16) are fixed during calibration. The assembled fuel injection system is packaged and delivered so that the calibrated system can be installed in the relative positions fixed during calibration.

12 Claims, 4 Drawing Sheets

SYSTEM FOR CALIBRATING AN INTEGRATED INJECTION NOZZLE AND INJECTION PUMP

CROSS-REFERENCE TO RELATED APPLICATIONS

This is the national stage of International Application No. PCT/US03/08550 filed Mar. 19, 2003.

BACKGROUND OF THE INVENTION

This invention relates generally to vehicle fuel delivery systems. More particularly, the present invention relates to a system for calibrating an integrated injection nozzle and injection pump.

Common practice for conventional diesel fuel injection systems has been to calibrate the injection pump with standardized, calibration-only injectors and standardized, calibration-only injection lines. When installed on the engine, the injection system is composed of the calibrated pump together with different injectors and different injection lines. Since variables in both the injectors and injection lines influence injection system performance, additional tolerance must be added to the fuel delivery and timing capabilities since the individual components were not calibrated together as a system.

Government mandated requirements to continually reduce both diesel engine emissions and fuel consumption, combined with commercial pressures to provide satisfactory performance to the customer, result in a need to more accurately calibrate diesel fuel injection systems and reduce system performance tolerances.

SUMMARY OF THE INVENTION

One aspect of the invention relates to calibrating the components of a fuel injection system as an assembly to eliminate differences between the tested components and the installed components. A further aspect of the invention relates to fixing the relative positions of some of the components of the fuel injection system during the calibration process. The components are maintained in the relative positions set during calibration during shipping and installation. The fixed relative positions set during calibration determine the positioning of the installed injection pump and its associated fuel control arm relative to engine components such as the fuel control rack. A further aspect of the invention relates to the marking and packaging of fuel injection assembly components selected during calibration so that the same components are installed to an internal combustion engine by the end user.

An object of the present invention is to provide a new and improved method for calibrating a fuel injection system that reduces calibration error due to differences between system components used during calibration and system components installed to an internal combustion engine.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
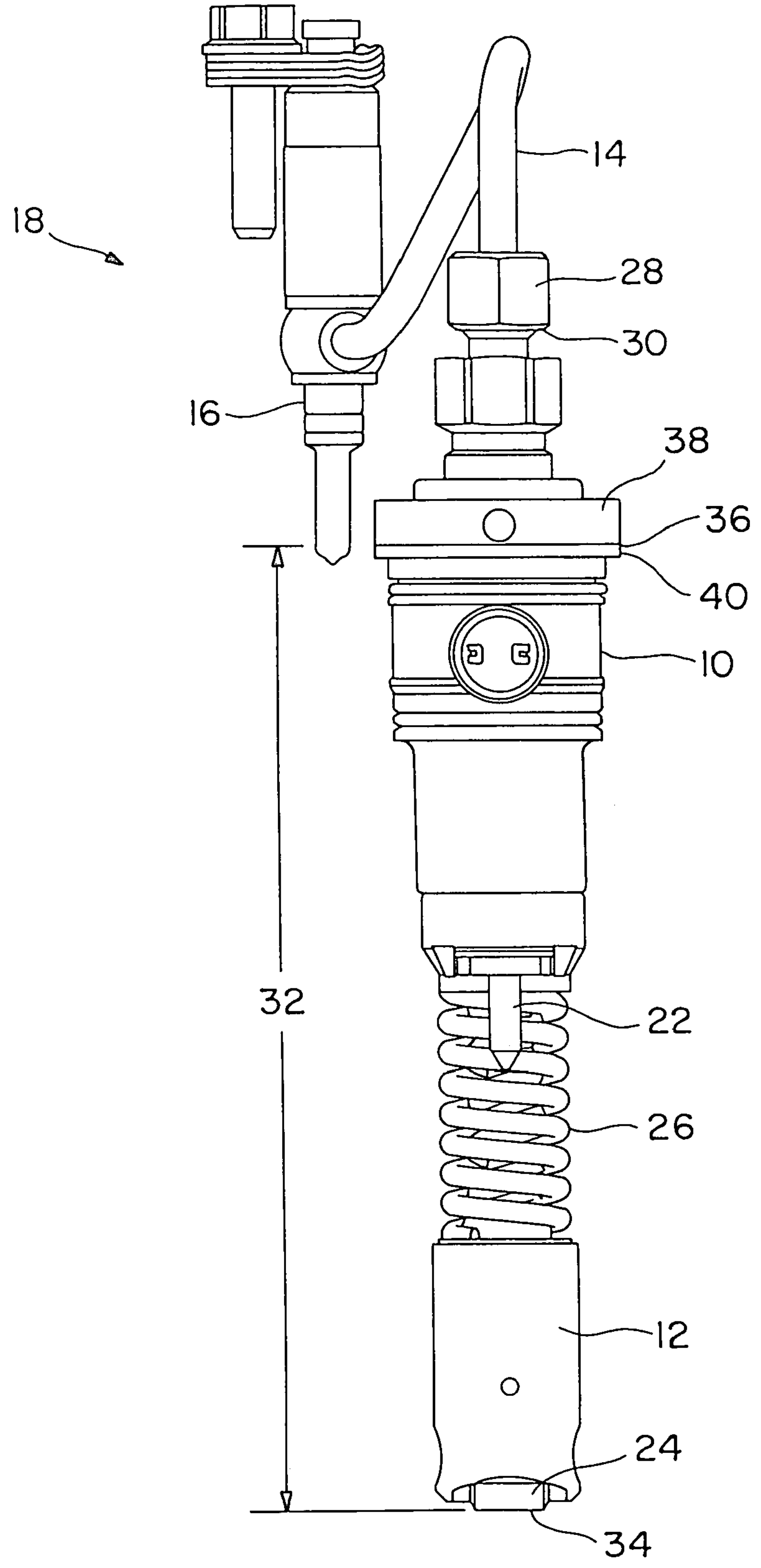
FIG. 1 is a side elevational view of an integrated nozzle/unit pump system.
Figure 2:
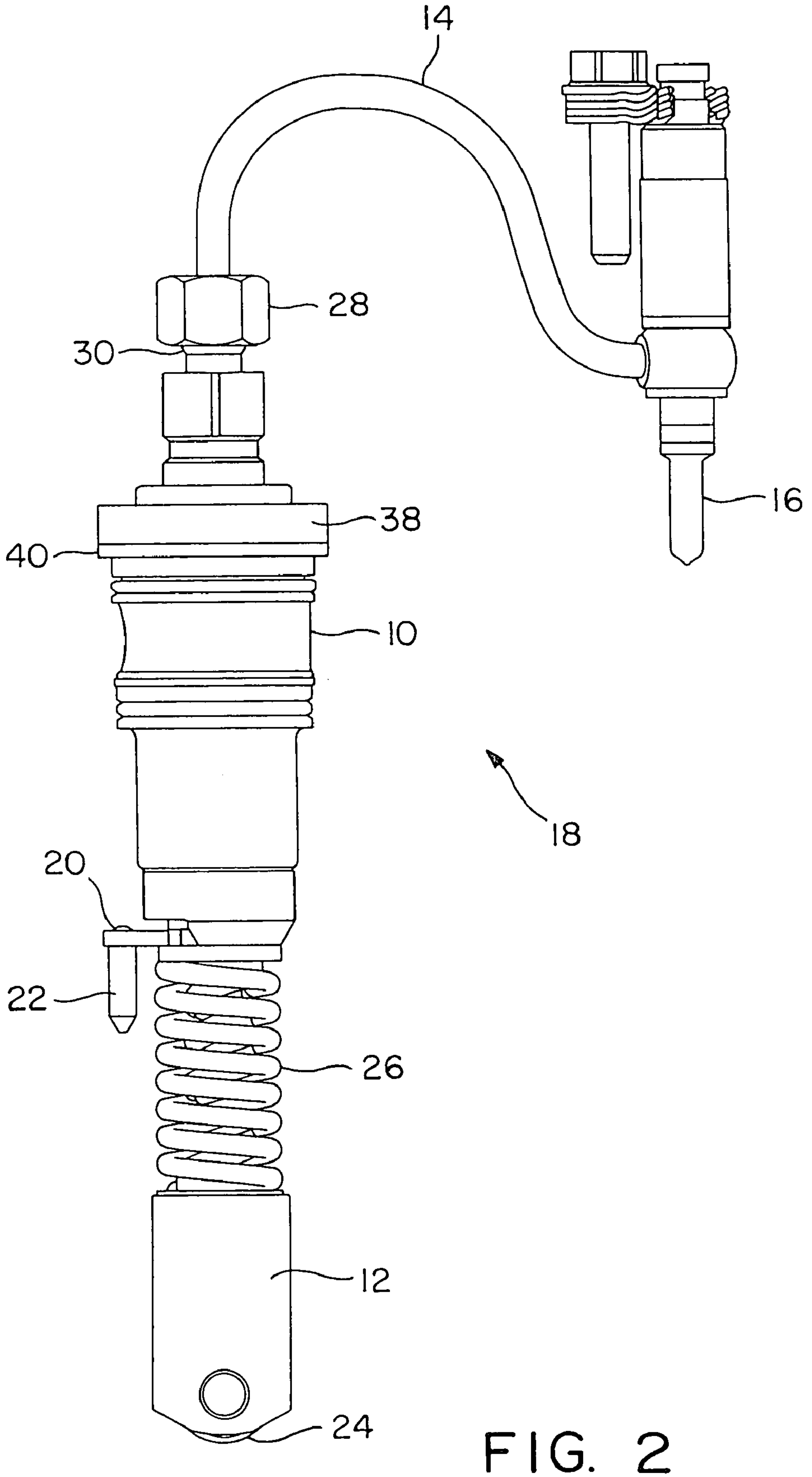
FIG. 2 is a front elevational view of the integrated nozzle/unit pump system of FIG. 1.
Figure 3:
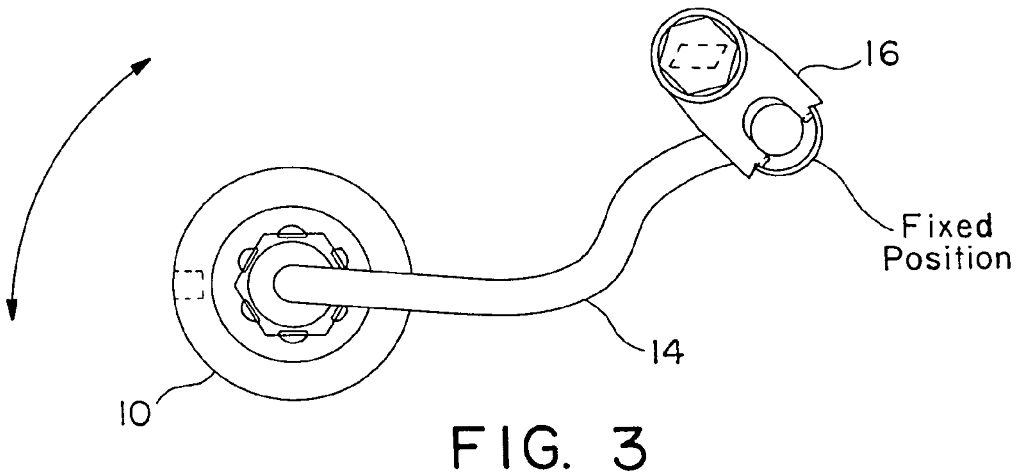
FIG. 3 is a top view of the integrated nozzle/unit pump system of FIG. 1.

In conventional diesel fuel injection systems, the injection pump is generally calibrated with standardized, calibration-only injectors and standardized, calibration-only injection lines. Tolerances of fuel delivery and timing are greater when the fuel injection system components are not tested together as a system.

With reference to FIGS. 1–4, wherein like numerals represent like parts throughout the several Figures, tolerances in fuel delivery and calibration may be reduced if the unit pump 10, cam follower 12, injection line 14, and injection nozzle 16 are calibrated as an integrated system 18, which is then installed on an engine in its calibrated configuration.

The unit pump 10 is a conventional pump having an internal plunger which is coupled to a radially extending fuel control arm 20 which has a control arm pin 22 that couples to a control rack (not shown). The control rack is moved by the engine governor act on the control arm pin 22 to turn the pump plunger to vary the amount of fuel delivered per stroke of the pump plunger. The cam follower 12 includes a tappet roller 24 that engages a lobe on the camshaft (not shown), which urges the pump plunger upward against the biasing force of a return spring 26.

The unit pump outlet is coupled to the injection line 14 via a nut 28 and threaded cylinder 30 coupling. The opposite end of the injection line is coupled to the injection nozzle 16, preferably with the end of the injection line being integrally and permanently joined to the body of the injection nozzle 16.

The components that are calibrated as a system are the unit pump 10, the cam follower 12 (or tappet), and the joined injection line 14/injection nozzle 16. The major system performance parameters that are calibrated and/or validated during the calibration process are fuel delivery (volume) at various engine speeds and rack positions, and injection timing at various engine speeds and rack positions. The calibration and performance is controlled by the system's characteristics as follows:

a. Fuel delivery at a given control arm setting is established by the rotational relationship of the pump 10 to the nozzle 16. (This is because the relative positions of pump 10 and the nozzle 16 will be fixed during calibration. This fixed relative relationship will be maintained through installation on an internal combustion engine as will be further discussed below.)

b. Fuel delivery at various speeds and fuel control arm positions is the result of a combination of the initial rack/fuel calibration (a, above) and the dynamic hydraulic characteristics that result from the geometry and dimensions of various parts in the pump 10 and nozzle 16.

c. At a given pump actuator rotational position, the distance 32 from the bottom 34 of the cam follower tappet roller 24 to the lower surface 36 of the pump mounting flange 38 establishes injection timing at the full fuel control arm setting.

d. Injection timing at various speeds and fuel control arm positions is the result of a combination of the initial timing calibration (c, above) and the dynamic hydraulic characteristics that result from the geometry and dimensions of various parts in the pump 10 and nozzle 16.

Figure 4:
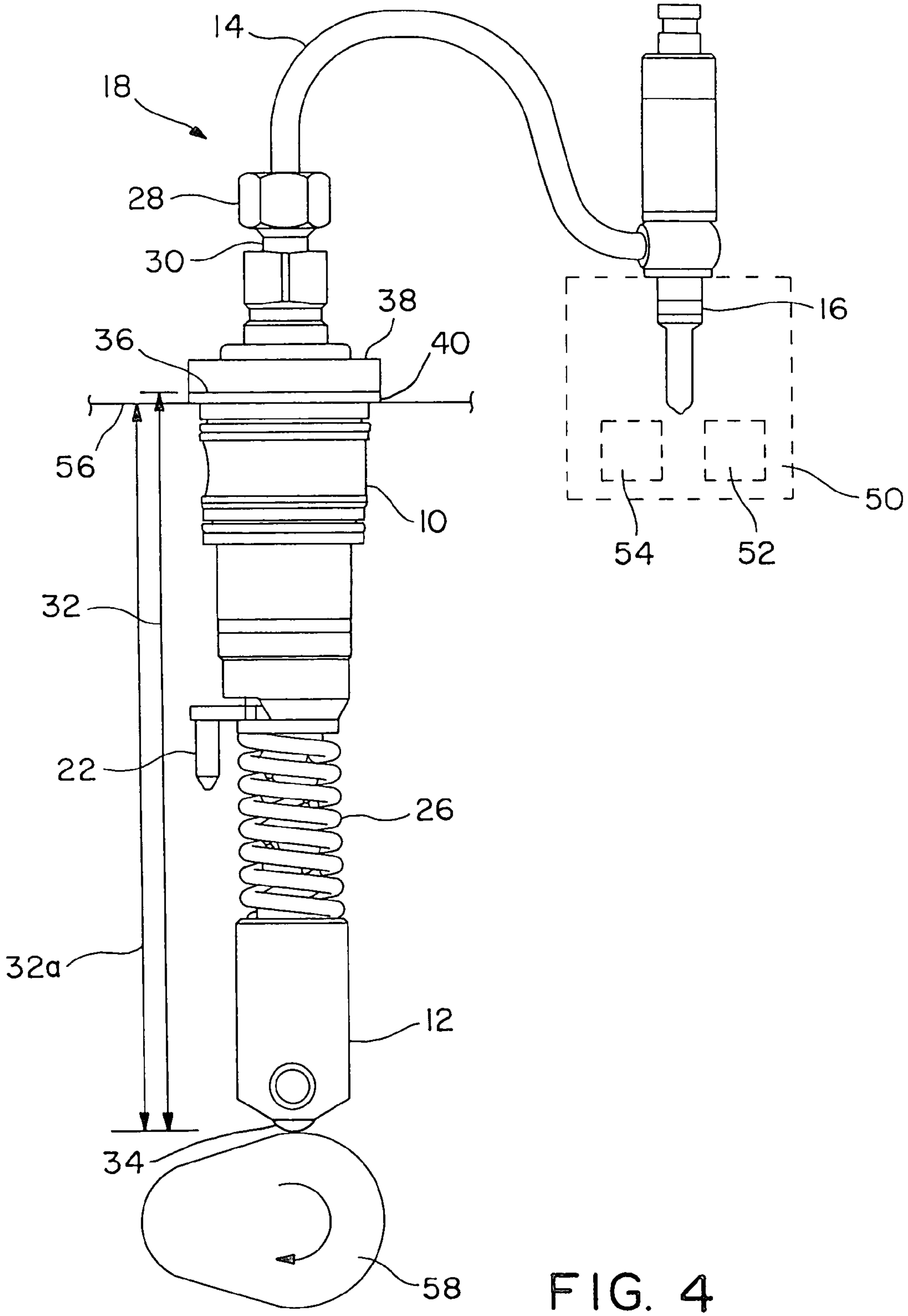
FIG. 4 is the integrated fuel injection system of FIG. 2 mounted to a test stand, with only pertinent portions of the test stand illustrated, partially in schematic form.

To calibrate the fuel injection system 18 and validate performance, the complete fuel injection system (unit pump 10, cam follower 12, and joined injection line 14/injection nozzle 16) is installed in a test stand as best seen in FIG. 4. The injection nozzle 16 is installed in a nozzle block 50 equipped with a pressure sensor 54 and a flow meter 52. The unit pump 10 and associated cam follower 12 are secured to a test stand mounting surface 56 with the tappet roller bottom surface 34 in contact with a rotating pump actuator 58. The pressure sensor 54 is arranged to measure the timing of a pulse of pressurized fuel leaving the injection nozzle 16 when the rotating pump actuator 58 actuates the unit pump 10. Timing is measured relative to a particular rotational position of the pump actuator for the purpose of injection system timing calibration. The flow meter 52 is arranged to measure the volume of each pulse of pressurized fuel. For purposes of injection system volume calibration, the volume of each pulse (also referred to as "fuel delivery") is measured at a plurality of pre-determined fuel control arm positions and pump actuator rotational speeds.

The integrated fuel injection system 18 is first operated on the test stand at a specified speed and setting of the fuel control arm 20 until performance is stabilized. After performance has stabilized, fuel delivery is observed at the specified speed and fuel control arm setting. The integrated fuel injection system 18 is then calibrated to the specified fuel delivery by loosening the connector nut 28 and rotating the pump 10 relative to the nozzle 16 (FIG. 3), with the fuel control arm 20 fixed at the specified setting. Fuel delivery is confirmed by operating the fuel injection system at several test speeds.

When the specified fuel delivery has been confirmed, the injection timing is observed at a specified speed and full fuel control arm setting. The timing of each injection pulse relative to the actuator rotational position is dependent upon the distance 32 between the lower surface 36 of the pump mounting flange 38 and the bottom 34 of the tappet roller 24. A timing shim or shims 40 are installed between the lower surface 36 of the mounting flange 38 and the test stand mounting surface 56. The integrated fuel injection system 18 is calibrated to a specified timing by adding or removing shims 40 under the pump mounting flange 38 to alter the distance 32 between the bottom 34 of the tappet roller 24 to the lower surface 36 of the pump mounting flange 38. It will be understood by those of skill in the art that the unit pump 10 and cam follower 12 are configured such that the tappet roller 24 is constantly in contact with the actuator 56 (see FIG. 4) or cam lobe. Varying the distance 32 between the bottom 34 of the tappet roller 24 to the lower surface 36 of the pump mounting flange 38 alters the axial position of the plunger within the pump 10 by slightly increasing or decreasing the length of the return spring 26. Increasing distance 32 retards injection timing, while decreasing distance 32 advances injection timing. It will also be understood that distance 32*a* between the test stand mounting surface 56 and pump actuator 58 is fixed, just as the distance between the mounting surface and cam lobe in an internal combustion engine will be fixed.

Finally, the integrated fuel injection system 18 is operated at various specified speeds and positions of the fuel control arm 20 to validate specified fuel delivery and injection timing performance.

After calibration and validation have been completed, the components of the integrated fuel injection system 18 are marked, packaged and delivered in a manner that assures the components are remain together and are installed into the engine as an integrated fuel injection system 18. In particular, the relatively rigid injection line 14 and frictional engagement provided by the tightened nut 28, maintain the relative positions of the pump 10 and the nozzle 16. Installation of the integrated fuel injection system 18 places the pump 10 in a particular angular orientation relative to the other parts of the engine (not shown). The nozzle 16 provides a convenient fixed position that is present on the test stand that is also present in a fixed location when the integrated fuel injection system is installed to the internal combustion engine. The inventive method provides a calibrated, integrated fuel injection system by calibrating the components that will be installed as a system and providing the assembled system to the customer in a calibrated configuration.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for calibrating an integrated fuel injection system comprising the steps of:

providing said integrated fuel injection system comprising an injection nozzle, an injection line, a cam follower including a tappet roller, a unit pump functionally connected to said injection line to deliver pulses of pressurized fuel through said injection line to said injection nozzle, and a fuel control arm radially projecting from said unit pump, wherein the timing of each said pulse relative to a rotating actuator acting on said tappet roller is dependent upon a distance between a bottom of said tappet roller and a lower surface of said unit pump mounting flange, and the volume of each said pulse is dependent upon an angular relationship between said fuel control arm and said unit pump;

installing the integrated fuel injection system on a test stand comprising a rotating pump actuator, a flow meter arranged to measure a volume of each said pulse, and a sensor arranged to measure the timing of each said pulse relative to a pre-determined reference rotational position of said pump actuator;

operating the integrated fuel injection system at a pre-determined actuator rotational speed and a pre-determined fixed position of the fuel control arm until performance of the fuel injection system is stabilized;

measuring the volume of each said pulse at said pre-determined actuator rotational speed and at said pre-determined fixed position of the fuel control arm;

when said measured volumes are not the same as a pre-specified volume then rotating said pump relative to said fixed fuel control arm until the measured volumes equal the pre-specified volume;

fixing the rotational position of said pump relative to said injection line, injection nozzle and fixed fuel control arm;

operating the fuel injection system at said pre-determined actuator rotational speed and a full fuel control arm position;

measuring the timing of said pulse relative to the pre-determined reference rotational position of said pump actuator;

when said measured timing is incorrect then adjusting the distance between the bottom of said tappet roller and the unit pump mounting flange lower surface to calibrate the timing of said pulse relative to said pre-determined reference rotational position of said pump actuator; and removing the integrated fuel injection system from the test stand as a calibrated, assembled unit to maintain the rotational position of the unit pump relative to the injection nozzle.

2. The method of claim 1, wherein said step of fixing comprises: tightening a coupling that secures said injection line to said unit pump.

3. The method of claim 1, wherein said step of fixing comprises: tightening a nut that secures said injection line to said unit pump.

4. The method of claim 1, comprising: marking and packaging said assembled unit so that all of the components of the integrated fuel injection system remain together in their assembled relative positions so they can be installed together.

5. The method of claim 1, comprising: validating the volume of each said pulse after said step of fixing and prior to said second step of operating, said step of validating comprising: operating the integrated fuel injection system at a plurality of test points, each said test point comprising a pre-determined pump actuator rotational speed and a pre-determined, fixed fuel control arm position; and comparing the volume of each said pulse produced at each said test point to a specified volume.

6. The method of claim 1, comprising: validating the volume and timing of fuel delivery by the integrated fuel injection system after said steps of fixing and adjusting, said step of validating comprising: operating the integrated fuel injection system at a plurality of test points, each said test point comprising a pre-determined pump actuator rotational speed and a pre-determined, fixed fuel control arm position; and comparing the volume and timing of each said pulse produced at each said test point to a specified volume and timing.

7. The method of claim 1, wherein said step of adjusting comprises: providing one or more timing shims between the unit pump mounting flange and the test stand mounting surface.

8. The method of claim 7, comprising: marking and packaging said assembled unit including said one or more timing shims so that all of the components of the integrated fuel injection system remain together in their assembled relative positions so they can be installed together.

9. The method of claim 1, comprising:

said step of installing the integrated fuel injection system on a test stand further comprises utilizing a first timing shim located between the unit pump mounting flange and the test stand mounting surface; and said step of adjusting comprises replacing said first timing shim with a second timing shim having a thickness different than the first timing shim.

10. The method of claim 9, comprising: marking and packaging said assembled unit including said second timing shim so that all of the components of the integrated fuel injection system remain together in their assembled relative positions so they can be installed together.

11. The method of claim 1, comprising:

said step of installing the integrated fuel injection system on a test stand further comprises utilizing one or more timing shims located between the unit pump mounting flange and the test stand mounting surface; and said step of adjusting comprises adding, removing, or replacing one or more timing shims.

12. The method of claim 11, comprising: marking and packaging said assembled unit including any remaining timing shims so that all of the components of the integrated fuel injection system remain together in their assembled relative positions so they can be installed together.

* * * * *

UNITED STATES PATENT AND TRADEMARK OFFICE

CERTIFICATE OF CORRECTION

PATENT NO. : 7,089,789 B2
APPLICATION NO. : 10/504950
DATED : August 15, 2006
INVENTOR(S) : Klopfer et al.

It is certified that error appears in the above-identified patent and that said Letters Patent is hereby corrected as shown below:

<u>Title Page:</u>

After Item [65], insert

--Related U.S. Application Data

(60) Provisional application No. 60/366,039, filed on Mar. 19, 2002.--

Signed and Sealed this

Sixteenth Day of June, 2009

JOHN DOLL
*Acting Director of the United States Patent and Trademark Office*